United States Patent [19]

Bernus et al.

[11] Patent Number: 5,763,972
[45] Date of Patent: Jun. 9, 1998

[54] MAGNETIC BEARING WITH ALTERNATING ACTUATORS AND SENSORS

[75] Inventors: Christophe Bernus, Paris; Patrice Jamain, Maule; Jean-Pierre Roland, Arthies, all of France

[73] Assignee: Aerospatiale Societe Nationale Industrielle, France

[21] Appl. No.: 767,310

[22] Filed: Dec. 16, 1996

[30] Foreign Application Priority Data

Dec. 18, 1995 [FR] France ................................. 9514965

[51] Int. Cl.⁶ .............................................. H02K 7/09
[52] U.S. Cl. ..................... 310/90.5; 310/90; 310/152; 310/156; 384/446
[58] Field of Search ................... 310/90.5, 90, 152, 310/156; 104/281; 384/446

[56] References Cited

U.S. PATENT DOCUMENTS

| 4,245,869 | 1/1981 | Scheffer et al. ...................... 308/10 |
| 4,918,345 | 4/1990 | Vaillant de Guelis et al. ....... 310/90.5 |
| 5,550,413 | 8/1996 | Bernus et al. ........................... 310/36 |
| 5,625,240 | 4/1997 | Bernus .................................... 310/90.5 |

FOREIGN PATENT DOCUMENTS 0 168 145  1/1986  European Pat. Off. .

OTHER PUBLICATIONS

Patent Abstracts of Japan, vol. 7, No. 141, JP-A-58 054219.
Patent Abstracts of Japan, vol. 10, No. 14, JP-A-60 175823.

*Primary Examiner*—Steven L. Stephan
*Assistant Examiner*—Timothy A. Williams
*Attorney, Agent, or Firm*—Vanophem Meehan & Vanophem, P.C.

[57] ABSTRACT

A magnetic bearing for magnetic centering of a rotor relative to a stator relative to two radial centering axes includes actuators operating relative to centering axes and speed sensors having sensing axes coplanar with the centering axes. The rotor includes a ring partly defining the airgaps of the actuators and the sensors.

10 Claims, 3 Drawing Sheets

MAGNETIC BEARING WITH ALTERNATING ACTUATORS AND SENSORS

BACKGROUND OF THE INVENTION

1. Field of the invention

The invention concerns a magnetic bearing for magnetically active centering relative to at least two radial centering axes of a second body rotating relative to a first body about an axis. The second body is often said to be suspended by the bearing.

2. Description of the prior art

Bearings of this kind are described, for example, in U.S. Pat. No. 4,211,452 (POUBEAU), U.S. Pat. No. 4,470,644 (WEISSER) and U.S. Pat. No. 4,918,345 (VAILLANT DE GUELIS, ROLAND, JAMAIN).

The person skilled in the art knows that magnetic centering of a body moving relative to another along three axes in a totally passive manner is not possible: it is always necessary to provide magnetically active centering for at least one axis. Magnetically passive centering is effected exclusively by permanent magnets, whereas magnetically active centering implies the use of a magnetic actuator including a coil in which an appropriate variable current is caused to flow.

Bearings of this kind are inherently stable along a certain number of axes (positive stiffness, similar to that of a spring, obtained by the passive return forces due to the magnet when the body is offset along these first axes) and unstable about other axes (negative stiffness due to variations in the airgap of the magnetic circuit constituted by the magnetic actuators themselves and at least part of the moving body). Control electronics actively stabilize the equilibrium relative to these other axes, using information on the instantaneous position (or even speed) of the suspended body, which it converts into currents which, flow in the coils, generating the necessary return forces along these other axes.

Magnetic bearings are routinely used in the case of rotating bodies. There are then two major categories of magnetic bearings:

- axially active magnetic bearings in which the coils provide active centering along the rotation axis, while centering along the diametral axes is in practice passive; one example of this is given in the previously mentioned U.S. Pat. No. 4,211,452; and
- radially active magnetic bearings in which centering along at least one axis transverse to the rotation axis is provided by magnetic actuators, centering along the rotation axis in theory being passive centering by magnets; one example of this is given in the previously mentioned U.S. Pat. Nos. 4,470,644 and 4,918,345.

Magnetic bearings can also be used for linear motion, as emerges from the previously mentioned document.

The various bearings of the prior art therefore require the installation of position or even speed sensors adapted to supply the necessary input signals to the active control loop. It is therefore necessary to provide a specific location for these sensors, which contributes to the non-negligible overall size of prior art bearings. Where magnetic bearings for rotating bodies are concerned, the sensors are offset along the rotation axis relative to the actuators proper, which has the additional disadvantage of the possibility of errors occurring if the rotation axis tilts, despite the gyroscopic stiffness; to overcome this, sensors may be provided on each axial side of the plane of the actuators (incurring a weight and overall size penalty). The same problem arises in the case of a bearing providing active centering transversely to a translation direction, all the more acutely in that there is no stiffness in tilting opposing the tilting motion.

Magnetic bearings are generally chosen to avoid all physical contact between the moving body and its environment, which is why the position or speed sensors are themselves of the contactless type.

An object of the invention is a magnetic bearing with two active centering radial axes which overcomes the above-mentioned drawbacks, i.e. the actuators and sensors of which are disposed in such a manner as to achieve precise centering easily and within a small overall size.

SUMMARY OF THE INVENTION

To this end the invention proposes a magnetic bearing for active magnetic centering of a second body rotating relative to a first body along at least two radial centering axes, embodying:

- at least one actuator for each radial centering axis, each actuator having at least one first ferromagnetic portion carried by the first body, a portion of which is surrounded by a control coil, a second ferromagnetic portion carried by the second body and forming, at least with the first ferromagnetic part, a magnetic circuit in which there are first airgaps of variable thickness parallel to the centering axis, and a permanent magnet generating a flux in the magnetic circuit;
- speed sensors disposed along radial sensing axes, the number of which is at least equal to the number of radial centering axes, each speed sensor including a first ferromagnetic part carried by the first body, a portion of which is surrounded by a sensing coil, a second ferromagnetic part carried by the second body and forming, at least with the first ferromagnetic part, a magnetic circuit in which there are second airgaps of variable thickness transversely to the rotation axis, and a permanent magnet generating a flux in the magnetic circuit; and
- a control circuit supplying to the control coil a control current according to the output signal of the speed sensors;

in which magnetic bearing the first and second airgaps are substantially coplanar and disposed around the centering axis in an alternating arrangement, the second body including a ring forming both the second ferromagnetic portion of the actuators and the second ferromagnetic part of the speed sensors.

It will be understood that centering is precise, independent of any tilting, since the speed is sensed substantially in the same transverse plane as that in which the magnetic centering forces are applied.

In accordance with preferred features of the invention:

- two actuators symmetrically disposed relative to the rotation axis are provided for each sensing axis. This guarantees enhanced centering efficiency for a given overall size;
- two sensors symmetrically disposed about the rotation axis are provided for each sensing axis. This improves the precision of sensing;
- the control coils and the sensing coils are on the same radial side of the ring of the second body. This enables the overall size to be minimized, either externally or internally of the ring;
- the control coils and the sensing coils are on opposite sides of the ring of the second body. This configuration satisfies particular overall size constraints that may be encountered in some applications;

the actuators and the sensors each further embody a third ferromagnetic portion closing the magnetic circuit and carried by the first body, the ring carried by the second body being formed of two transverse pole rings between which there is inserted an annular plurality of axially magnetized permanent magnets. This makes it possible to divide the magnetic flux between the first and third ferromagnetic portions, thus minimizing coupling between the tilt, radial and axial stiffnesses;

the permanent magnets of the actuators and the sensors are carried by the first ferromagnetic parts, static spacers being provided in the portion of the magnetic circuit linking the poles of the magnets. This makes it possible to produce a solid ferromagnetic material rotor that is simpler than in the previous version; the sensing axes are at equal angles to the centering axes. This makes it possible for the sensitivity of the sensing axes to be identical;

the centering axes are orthogonal to each other, the sensing axes are orthogonal to each other and the sensing axes are at 45° to the centering axes; and the core of a sensor is surrounded by two compensation coils respectively mounted with the control coils of two actuators between which the sensor is circumferentially situated. This achieves good decoupling of the detection by a sensor from control signals applied to the control coil of the actuators between which it is disposed.

Objects, features and advantages of the invention will emerge from the following description given by way of non-limiting example with reference to the accompanying drawings.

DETAILED DESCRIPTION OF THE PREFERRED EMBODIMENTS

Figure 1:
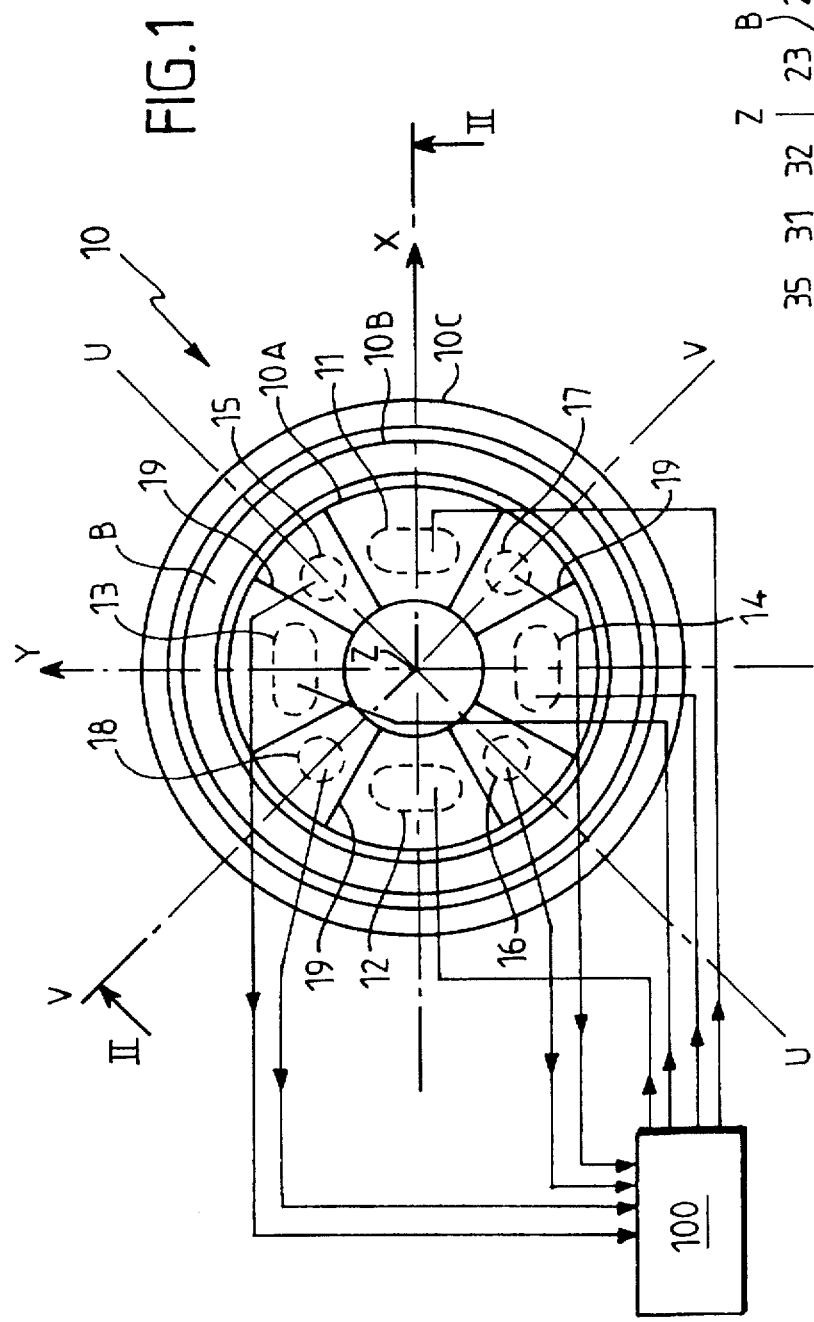
FIG. 1 is a diagrammatic view of a radially active magnetic bearing constituting a first embodiment of the invention.

FIG. 1 is a diagrammatic representation of a magnetic bearing 10 for magnetically active centering along at least two radial centering axes X and Y of a body B rotating relative to a body A (FIG. 2) about a rotation axis Z perpendicular to the plane of the figure. In practice the body B rotates relative to the body A and therefore the body B is generally called the rotor and the body A is called the stator.

The magnetic bearing 10 essentially includes a central part 10A (in practice including a central hole), an intermediate ring 10B and an exterior ring 10C.

Annular airgaps are formed between the central part and the intermediate ring and between the intermediate ring and the exterior ring.

The X and Y axes are radial centering axes. To this end the bearing embodies at least one actuator for each radial centering axis. In the example considered here, there are two actuators for each radial centering axis, one on each side of the rotation axis Z.

There are therefore two pairs of actuators, actuators 11 and 12 for the centering axis X and actuators 13 and 14 for the centering axis Y.

The bearing 10 from FIG. 1 has two centering axes X and Y; it is to be understood that the following description can readily be generalized to the case where a greater number of radial centering axes is required, for whatever reason.

In accordance with one essential feature of the invention, the bearing 10 from FIG. 1 includes speed sensors disposed in substantially the same plane as the actuators 11 through 14, in a circumferentially alternating arrangement; in the example shown these sensors 15 and 16, 17 and 18 are disposed inside the intermediate ring, like the actuators.

Figure 2:
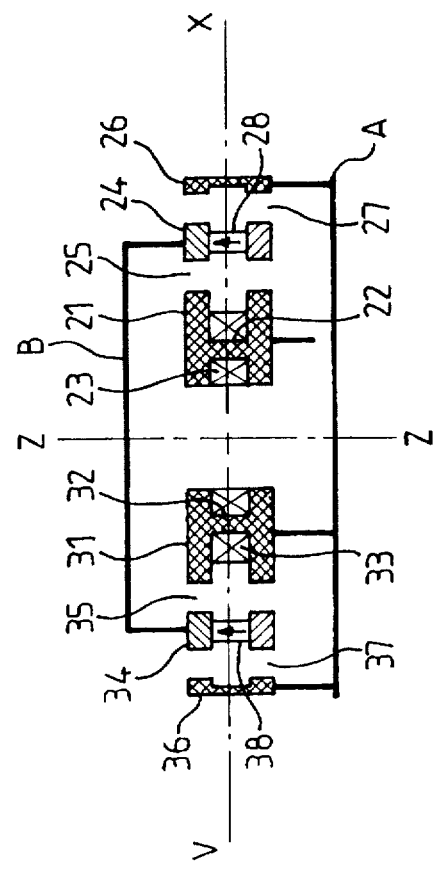
FIG. 2 is a diagrammatic view of it in section on the broken line II—II in FIG. 1.

FIG. 2 shows the bearing 10 from FIG. 1 in section on the broken line II—II with the result that the righthand part of FIG. 2 shows an actuator in section and the lefthand part shows a speed sensor in section.

All the actuators have the same structure.

As is clear from FIG. 2, each actuator includes at least one first ferromagnetic portion 21 carried by the first body and a portion 22 of which, generally called the core, is surrounded by a control coil 23. This actuator further include a second ferromagnetic portion 24 carried by the second body B, i.e. the rotor, and forming, at least with the first ferromagnetic portion 21, a magnetic circuit in which there are two first airgaps 25 of variable thickness parallel to the centering axis concerned, here the X axis. The actuator further includes a permanent magnet 28 generating a flux in this magnetic circuit.

In the example of FIGS. 1 and 2 the magnetic circuit further includes, fastened to the portion 21, a ferromagnetic closure part 26 radially opposite the first ferromagnetic portion 21 relative to the second ferromagnetic portion 24, being separated from the second ferromagnetic portion 24 by a pair of airgaps 27. The previously mentioned magnet 28 is within the second ferromagnetic portion, between two polepieces transverse to the rotation axis Z, so that the magnetic flux generated continuously by the magnet in an axial direction is divided, between the first ferromagnetic portion 21 carrying the control coil and the ferromagnetic closure part 26, according to the radial position of the rotor relative to the stator along the centering axis.

Each speed sensor has a structure that is substantially similar to that just described in connection with the actuators.

Thus each speed sensor includes a first ferromagnetic part 31 carried by the first body A or stator and a portion 32 of which, usually called the core, carries a sensing coil 33; the speed sensor further includes a second ferromagnetic part 34 carried by the rotor and forming, at least with the first ferromagnetic part 31, a magnetic circuit in which there are two second airgaps 35.

The speed sensor finally includes a third ferromagnetic part 36 disposed radially opposite the first ferromagnetic portion 31 relative to the second ferromagnetic portion.

This radially external third ferromagnetic portion is separated from the second ferromagnetic portion 34 by a pair of airgaps 37. A permanent magnet 38 is provided for generating a flux in this magnetic circuit. As with the actuator, the magnet 38 is here disposed between two transverse polepieces of the second ferromagnetic portion 34.

As is clear from FIG. 1, the various speed sensors and the various actuators are connected to a control circuit adapted to apply to the control coil of the various actuators control currents defined by the speed sensor output signals. This control circuit 100 is conventional in design and will not be described in more detail here.

FIG. 2 shows that the first and second airgaps of the actuators and the sensors, respectively, are substantially coplanar and distributed around the rotation axis in an alternating arrangement.

To be more precise, the second ferromagnetic parts or portions of the actuators and of the speed sensors, respectively, are constituted by a common ring, i.e. the intermediate ring 10B from FIG. 1, composed of two pole rings between which is clamped an annular series of axially magnetized permanent magnets. The airgaps to either side of these annular rings forming polepieces are coplanar within the actuators, on the one hand, and within the speed sensors, on the other hand, in two planes that are slightly offset in the axial direction, defined by the planes of the pole rings.

The radial lines 19 in FIG. 1 symbolize radial slots extending between the coils, from the internal airgap towards the central hole (without necessarily reaching the latter), to prevent the cores of the adjoining sensors short-circuiting the magnetic flux of the coil of an actuator, and vice-versa.

The sensing axes, i.e. the radial directions marked U and V coplanar with the X and Y axes and with respect to which the speed sensors sense movements, are preferably at equal angles to the centering axes between which the sensing axes are disposed. As mentioned above, the bearing 10 from FIGS. 1 and 2 has two radial centering axes and as the latter are at right angles to each other it follows that the sensing axes are themselves at right angles to each other, each being at an angle of 45° to each of the two radially centering axes.

Figure 4:
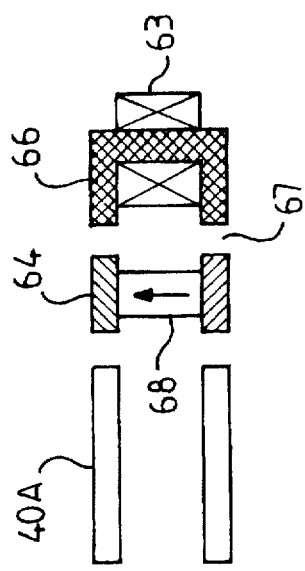
FIG. 4 is a diagrammatic view of it in radial section on the line IV in FIG. 3.
Figure 5:
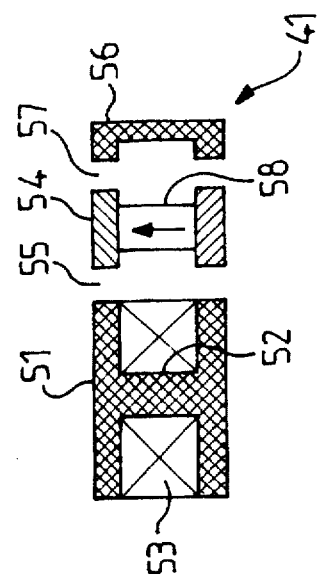
FIG. 5 is a diagrammatic view in radial section on the line V in FIG. 3.
Figure 3:
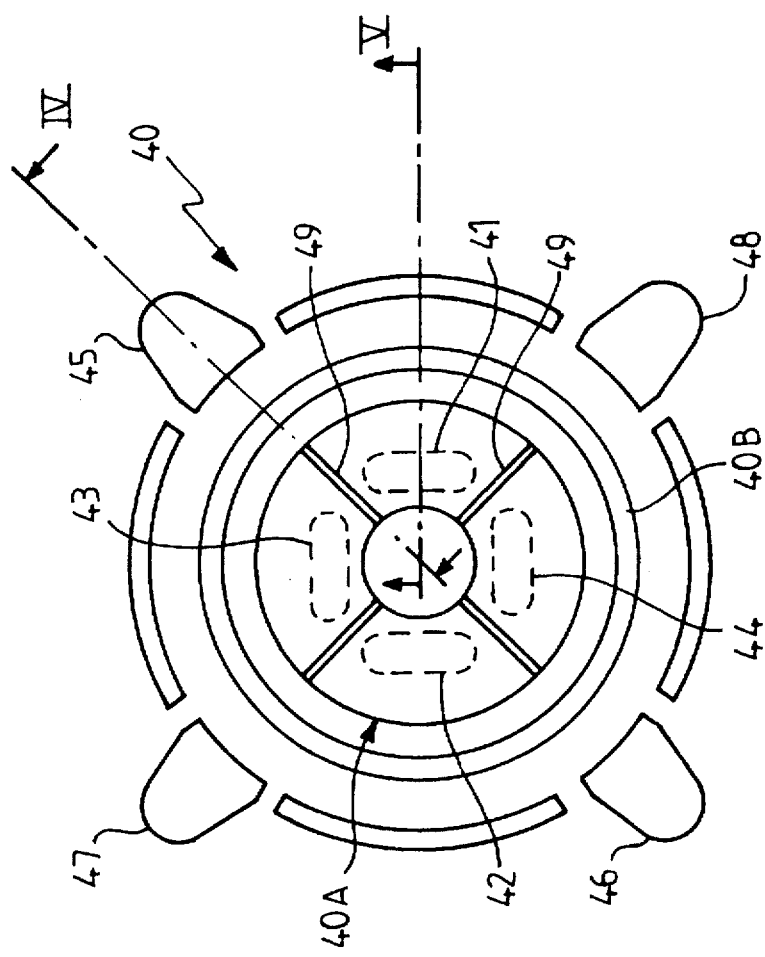
FIG. 3 is a diagrammatic view of a variant embodiment of the bearing from FIGS. 1 and 2.

FIG. 3, complemented by FIGS. 4 and 5, shows a variant embodiment of the bearing 10 from FIGS. 1 and 2, from which it differs in that the coils of the speed sensors are radially outside the intermediate ring.

The bearing 40 in FIG. 3 includes two actuators 41 and 42 for the X axis and two actuators 43 and 44 for the Y axis with the same structure as that shown in the righthand part of FIG. 2. These actuators are shown in more detail in FIG. 5, which shows the actuator 41 by way of example.

The actuator 41 includes a first ferromagnetic art 51 carried by the stator and a part 52, called the core, which is surrounded by a control coil 53. This actuator further includes a second ferromagnetic portion 54 carried by the rotor formed of two polepieces between which is disposed an axially magnetized permanent magnet 58. Between the stator first ferromagnetic part and the rotor second ferromagnetic part are two airgaps 55. Radially externally of the second ferromagnetic portion 54 is a stator third ferromagnetic portion 56 separated from the second ferromagnetic portion by a pair of airgaps 57.

Radial slots 49 separate the first ferromagnetic portions of neighboring actuators in the circumferential direction to prevent magnetic short-circuits between them; here these slots are parallel to the sensing axes.

As shown in FIG. 4, on the other hand, speed sensors 45 and 46, 47 and 48, show in FIG. 3, each include a radially external ferromagnetic part 66 carried by the stator and a rotor second ferromagnetic portion 64 separated from the first part 66 by a pair of airgaps 67. The second ferromagnetic portion 64 is formed of two polepieces offset axially, the edges of which define the airgaps and between which there is a permanent magnet 68. To the left of this second ferromagnetic portion from FIG. 4 are shown the radial edges of two parallel parts between which there is no contact, namely the polepieces 51 of the actuators. In practice the flux from the magnet continues to be divided between the first ferromagnetic portion, and therefore through a sensor coil 63, on the one hand, and through the actuator 41 and/or 43, on the other hand.

In the bearing from FIG. 3 the rotor second ferromagnetic portions 54 and 64 of the actuators, on the one hand, and of the speed sensors, on the other hand, comprise a single and common intermediate ring 40B, as in FIGS. 1 and 2. On the other hand, the first ferromagnetic portions of the speed sensors are disposed in areas in which the exterior ring through which the magnetic circuit of the actuators is closed is interrupted; in practice these interruptions prevent magnetic short-circuiting between sensors.

It will be readily understood that, knowing beforehand the orientation of the sensing axes relative to the centering axes, it is very easy to detect by addition or subtraction the values of the speed corresponding to the centering axes, based on the measurement signals for the two sensing axes. This calculation can naturally be done after identification of the speed value or by simple addition or subtraction of the voltages of the signals generated in the control coils on the sensing axes, because of transverse movements of the rotor relative to the stator.

In practice, there may be situations in which the voltages detected at the terminals of the sensing coils contain, in addition to information on the radial speed of the rotor along the sensing axis concerned, a part proportional to the derivative of the control currents applied according to the centering axes between which the speed sensor concerned is located. Some of the magnetic flux of the actuator can, by circulating circumferentially through the polepieces of the rotor ferromagnetic part, pass into the sensor coils and therefore modify the signal corresponding to the measured speed. This coupling of the control system input voltage to the control current can make rotor control unstable. It is then desirable to limit the coupling between actuators and sensors. This can easily be achieved by means of so-called compensation coils (see FIG. 6) disposed in series with the control coils of one and/or the other actuator between which the speed sensor concerned is circumferentially disposed.

Figure 6:
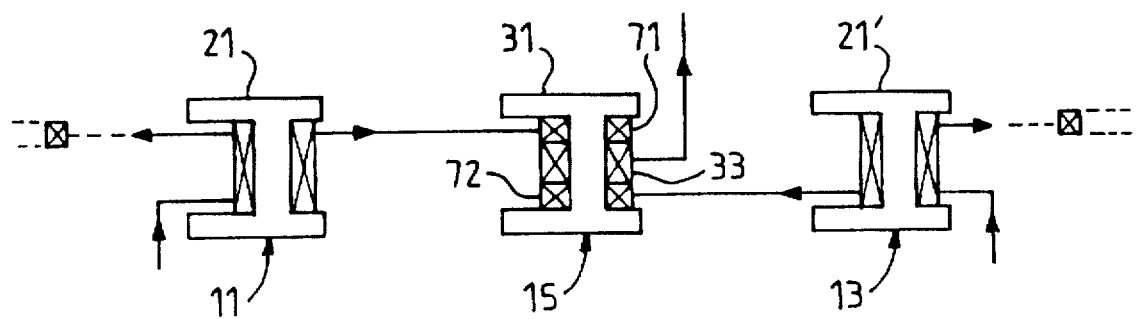
FIG. 6 is a diagrammatic view of the electrical arrangement of a sensor disposed angularly between two actuators.

FIG. 6 shows in schematic form the first ferromagnetic part 31 of a sensor, for example the speed sensor 15, and those 21 and 21' of two actuators between which it is located, i.e. (in FIG. 1) the actuators 11 and 13.

Around the core portion of the first ferromagnetic part of the sensor 15 are wound not only the sensing coils like the coils 33 in FIG. 2 but also a compensation coil 71 connected in series with the control coil of the first ferromagnetic part of the actuator 11 and a compensation coil 72 connected in series with the control coil of the first ferromagnetic part of the actuator 13.

As shown in FIG. 6, to allow for the fact that each actuator is disposed between two speed sensors, each control coil is connected in series with two compensation coils carried by respective sensors. The control coils comprises 380 turns and the compensation coils comprise 50 turns, for example.

Other variants are readily deduced from FIGS. 1 and 2, on the one hand, and from FIGS. 3 and 4, on the other hand. One such variant, not shown, has all the coils outside the rotor ring (this amounts to interchanging the stator ferromagnetic parts of each of the righthand and lefthand parts of FIG. 2). In another variant the control coils are outside the rotor ring; this amounts to interchanging the stator ferromagnetic part from FIG. 4, on the one hand, and from FIG. 5, on the other hand.

The description just given with respect to FIGS. 1 through 6 corresponds to an adaptation of a bearing as described in the previously mentioned U.S. Pat. No. 4,470,644.

The invention is readily generalized to the situation of a bearing as described in U.S. Pat. No. 4,918,345, also mentioned previously.

Figure 7:
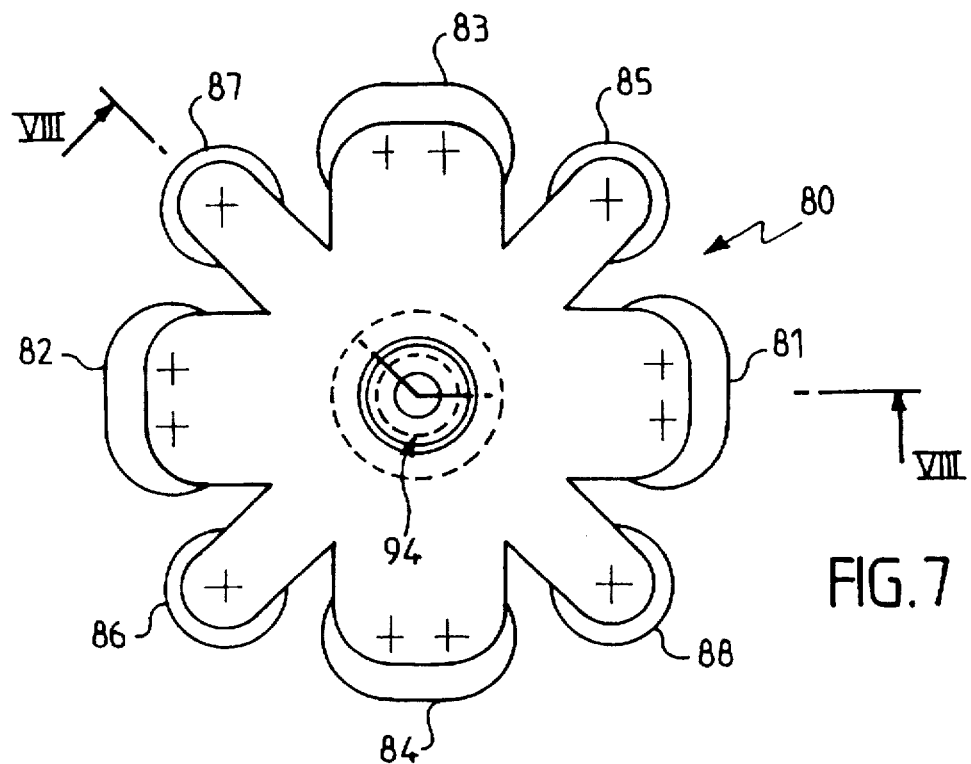
FIG. 7 is a plan view of another bearing constituting a second embodiment of the invention.
Figure 8:
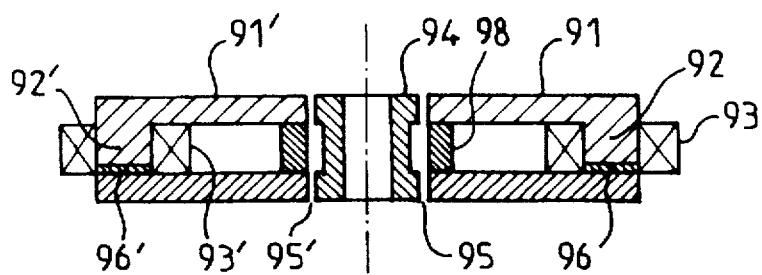
FIG. 8 is a view of it in section on the broken line VIII—VIII in FIG. 7.

Accordingly, FIGS. 7 and 8 show a bearing 80 in which the actuators 81 through 84 and the speed sensors 85 through 88, which alternate circumferentially, each embody two parts entirely defining the magnetic circuit of the actuator/sensor.

A portion 92 of the stator part 91 of each actuator constitutes the core of a control coil 93 between two polepieces between which an axially magnetized permanent magnet 98 is inserted. The rotor part 94 is "bare" in that it merely closes the flux through airgaps 95, 95' of variable thickness. There is advantageously a static spacer 96 in the magnetic circuit linking the poles of the magnets in order to avoid "short-circuiting" the magnet in the actuators and sensors.

The sensors are of similar structure. The reference numbers for them are the same as for the actuators but "primed".

In FIG. 7 the control coils and sensing coils are all radially external. A variant, not shown, has all these coils radially inside the rotor part. Compensation coils are advantageously used, as in FIG. 6. Note here also the existence in the ferromagnetic parts of cut-outs or slots preventing short-circuits between actuators and sensors.

It will be realized that in all the examples shown the edges of the rotor portions that partly define the airgaps of the magnetic circuits of the actuators additionally partly define the airgaps of the magnetic circuits of the sensors, which contributes to a compact overall size, high accuracy and low cost.

Moreover, and this applies to all versions of the bearing mentioned above, the fact of using the sensor coils to measure the position and/or the speed of the rotor parts driven by the actuators can eliminate any vibration generated by a conventional bearing controlled by separate sensors when the rotor rotates. The separate sensors detect the position of the center of the track "read" by these sensors and this center is not forcibly concentric with that of the rotor ring of the bearing, whence the occurrence of a disturbance.

The bearing that is the subject matter of the patent totally eliminates this defect by making the sensor center identical with the actuator center.

It goes without saying that the foregoing description has been given by way of non-limiting example only and that numerous variants may be put forward by the person skilled in the art without departing from the scope of the invention.

There is claimed:

1. A magnetic bearing for active magnetic centering on a centering axis of a second body moving about a rotation axis relative to a first body along at least two radial centering axes, said magnetic bearing having radial sensing axes equal in number to said at least two radial centering axes, said magnetic bearing comprising:

an actuator for each of said radial centering axes, said actuator comprising:
   at least one first ferromagnetic member carried by said first body;
   a control coil surrounding said at least one first ferromagnetic member of said first body; and
   a second ferromagnetic member carried by said second body, said first and second ferromagnetic members forming a magnetic circuit, said magnetic circuit further comprising:
      a first pair of airgaps having varying thickness, said airgaps between said first and second ferromagnetic members; and
   a permanent magnet mounted on said first body for generating a flux in said magnetic circuit;

a plurality of speed sensors radially disposed along said radial sensing axes, said plurality of speed sensors generating an output signal, each of said speed sensors comprising:

a first ferromagnetic member carried by said first body;
a sensing coil surrounding a portion of said first ferromagnetic member;
a second ferromagnetic member carried by said second body, said first and second ferromagnetic members forming a magnetic circuit, said magnetic circuit further comprising:
   a second pair of airgaps having a variable thickness in a direction transverse to said rotation axis, said first and second pairs of airgaps disposed around and co-planar to said at least two radial centering axes in an alternating arrangement; and
a permanent magnet mounted on said second body for generating a flux in said magnetic circuit;

a ring on said second body, said ring formed from said second ferromagnetic members of said actuators and said second ferromagnetic members of said plurality of speed sensors; and a control circuit applied to said control winding for generating a current to said control winding, said current dependent upon said output signal of said speed sensors.

2. The magnetic bearing as claimed in claim 1 wherein said actuator further comprises a third ferromagnetic member carried by said first body, said third ferromagnetic member closing said magnetic circuit;
said sensor further comprising a third ferromagnetic member carried by said first body, said third ferromagnetic member closing said magnetic circuit; and
said ring further comprising two transverse pole rings having a plurality of axially magnetized permanent magnets arranged in an annular pattern and located between said two transverse pole rings.

3. The magnetic bearing as claimed in claim 1 wherein each of said plurality of speed sensors is circumferentially situated between two actuators, each of said plurality of speed sensors further comprises:
a core; and
two compensation coils surrounding said core mounted respectively with said control coils of said two actuators.

4. The magnetic bearing as claimed in claim 1 further comprising two actuators symmetrically disposed about said rotation axis for each radial sensing axis.

5. The magnetic bearing as claimed in claim 1 further comprising two sensors symmetrically disposed about said rotation axis for each sensing axis.

6. The magnetic bearing as claimed in claim 1 wherein said control coil and said sensing coil are located on a same radial side of said ring of said second body.

7. The magnetic bearing as claimed in claim 1 wherein said control coil and said sensing coil are located on opposite sides of said ring of said second body.

8. The magnetic bearing as claimed in claim 1 wherein said actuators and said sensors each further comprise a third ferromagnetic portion carried by said first body and closing said magnetic circuit, said ring carried by said second body being formed of two transverse pole rings between which there is inserted an annular plurality of axially magnetized permanent magnets.

9. The magnetic bearing as claimed in claim 1 wherein each of said sensing axes are at equal angles to each of said centering axes.

10. The magnetic bearing as claimed in claim 9 wherein said centering axes are orthogonal to each other, said sensing axes are orthogonal to each other and said sensing axes are at a 45° angle to said centering axes.

* * * * *